(12) United States Patent
Nishihara

(10) Patent No.: US 9,769,384 B2
(45) Date of Patent: Sep. 19, 2017

(54) IMAGING APPARATUS CAPABLE OF DETECTING POSITION OF MOVABLE IMAGE PICKUP DEVICE AT FIRST RESOLVING POWER AND AT SECOND RESOLVING POWER HIGHER THAN FIRST RESOLVING POWER AND, AT WHICH SECOND RESOLVING POWER, DEVIATION AMOUNT IS LESS THAN OR EQUAL TO PIXEL SHIFT AMOUNT

(71) Applicant: OLYMPUS CORPORATION, Shibuya-ku, Tokyo (JP)

(72) Inventor: Rintaro Nishihara, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/060,554

(22) Filed: Mar. 3, 2016

(65) Prior Publication Data
US 2016/0248978 A1    Aug. 25, 2016

Related U.S. Application Data

(63) Continuation of application No. PCT/JP2015/070711, filed on Jul. 21, 2015.

(30) Foreign Application Priority Data

Feb. 19, 2015   (JP) .................. 2015-030903

(51) Int. Cl.
*H04N 5/228*   (2006.01)
*H04N 5/232*   (2006.01)
(Continued)

(52) U.S. Cl.
CPC ....... *H04N 5/23267* (2013.01); *H04N 5/2254* (2013.01); *H04N 5/2259* (2013.01);
(Continued)

(58) Field of Classification Search
CPC .......... H04N 5/23267; H04N 5/23287; H04N 5/2328; H04N 5/23248; H04N 5/23258;
(Continued)

(56) References Cited

U.S. PATENT DOCUMENTS

| 8,023,812 | B2* | 9/2011 | Suzuka | ................ G02B 27/646 |
| | | | | 348/208.11 |
| 8,279,293 | B2* | 10/2012 | Noto | ........................ G03B 5/00 |
| | | | | 348/208.7 |

(Continued)

FOREIGN PATENT DOCUMENTS

| JP | 11038461 A | 2/1999 |
| JP | 2000013670 A | 1/2000 |

(Continued)

OTHER PUBLICATIONS

International Search Report (ISR) dated Oct. 20, 2015 issued in International Application No. PCT/JP2015/070711.
(Continued)

*Primary Examiner* — Kelly L Jerabek
(74) *Attorney, Agent, or Firm* — Holtz, Holtz & Volek PC

(57) ABSTRACT

An imaging apparatus includes a camera shake correction unit which uses a coil and a magnet to move a movable portion including an image pickup device relative to a fixed portion. A position detection section detects the position of the movable portion. A setting section sets a resolving power of the detection of the position by the position detection section to a first or second resolving power which is a resolving power higher than the first resolving power and at which an amount of deviation from a target position is less than or equal to a pixel shift amount. A drive control section performs pixel shifts to move the movable portion with the second resolving power set by the setting section. A photography control section causes the image pickup device to (Continued)

perform exposures by timing of the pixel shifting and which composes images obtained by the exposures.

11 Claims, 12 Drawing Sheets

(51) Int. Cl.
*H04N 5/225* (2006.01)
*H04N 5/349* (2011.01)

(52) U.S. Cl.
CPC ......... *H04N 5/23287* (2013.01); *H04N 5/349* (2013.01); *G03B 2205/0038* (2013.01)

(58) Field of Classification Search
CPC .................. G02B 27/64; G02B 27/646; G03B 2205/0007; G03B 2205/0023; G03B 2205/0038; G03B 2205/0015
USPC ...... 348/208.99, 208.2, 208.4, 208.7, 208.11
See application file for complete search history.

(56) References Cited

U.S. PATENT DOCUMENTS

| 8,294,812 | B2 | 10/2012 | Okada et al. | |
|---|---|---|---|---|
| 8,334,909 | B2* | 12/2012 | Shirono | H04N 5/23248 348/208.2 |
| 2003/0142218 | A1* | 7/2003 | Yamazaki | H04N 5/23248 348/208.6 |
| 2011/0063458 | A1* | 3/2011 | Washisu | G03B 5/00 348/208.2 |

FOREIGN PATENT DOCUMENTS

| JP | 2007017706 A | 1/2007 |
|---|---|---|
| JP | 2010063088 A | 3/2010 |
| JP | 2012217179 A | 11/2012 |
| JP | 2014224940 A | 12/2014 |

OTHER PUBLICATIONS

Japanese Office Action dated Oct. 13, 2015 issued in counterpart Japanese Application No. 2015-030903.

* cited by examiner

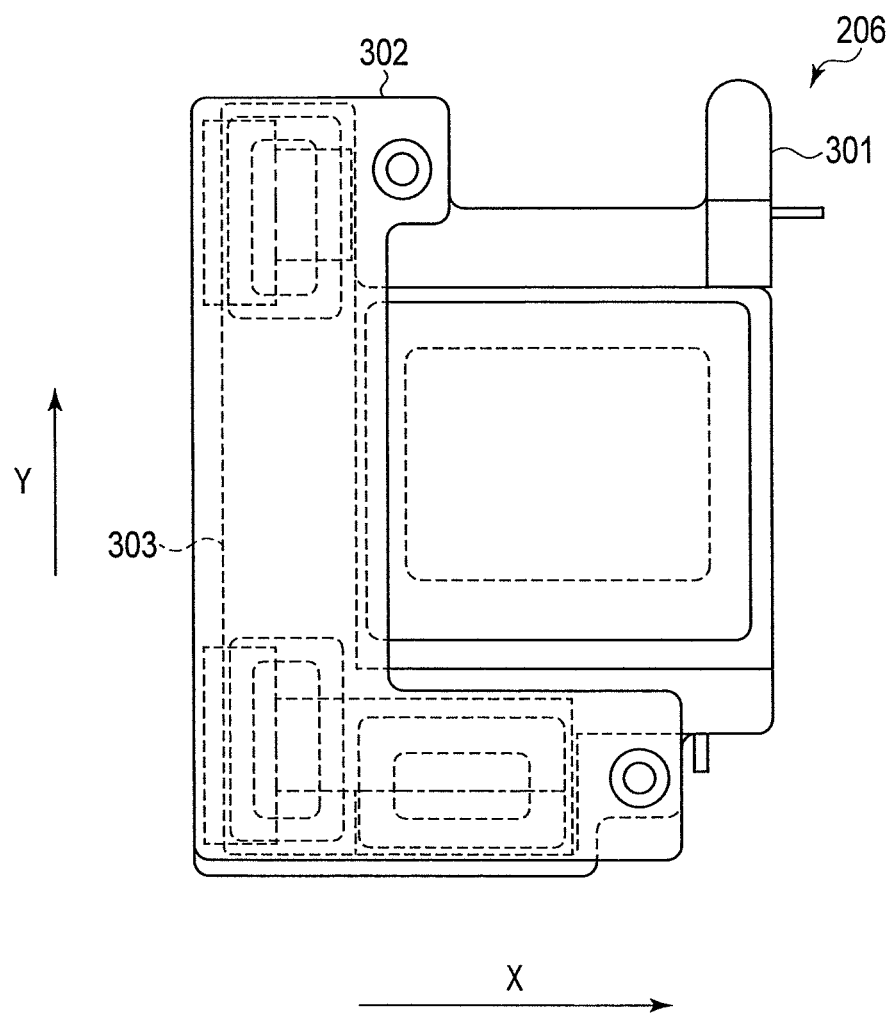
F I G. 2

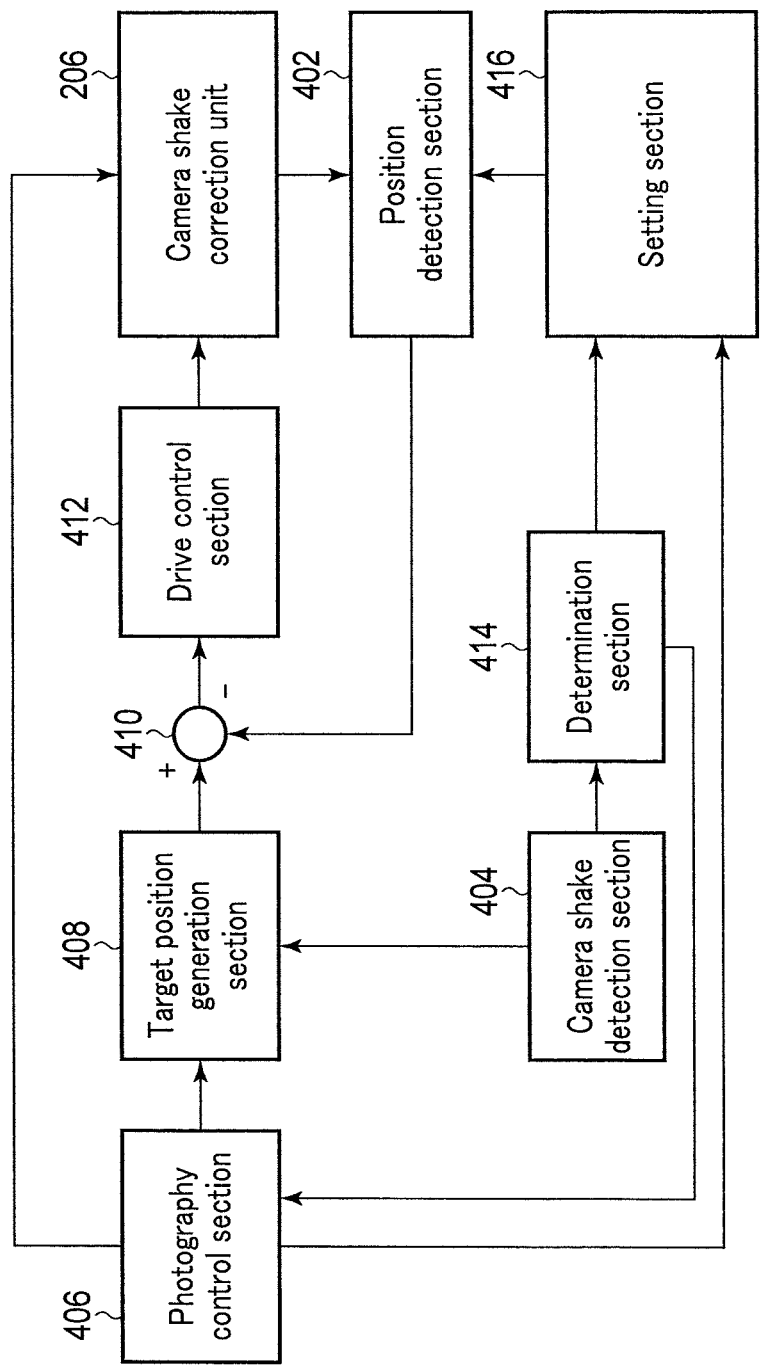
F I G. 5

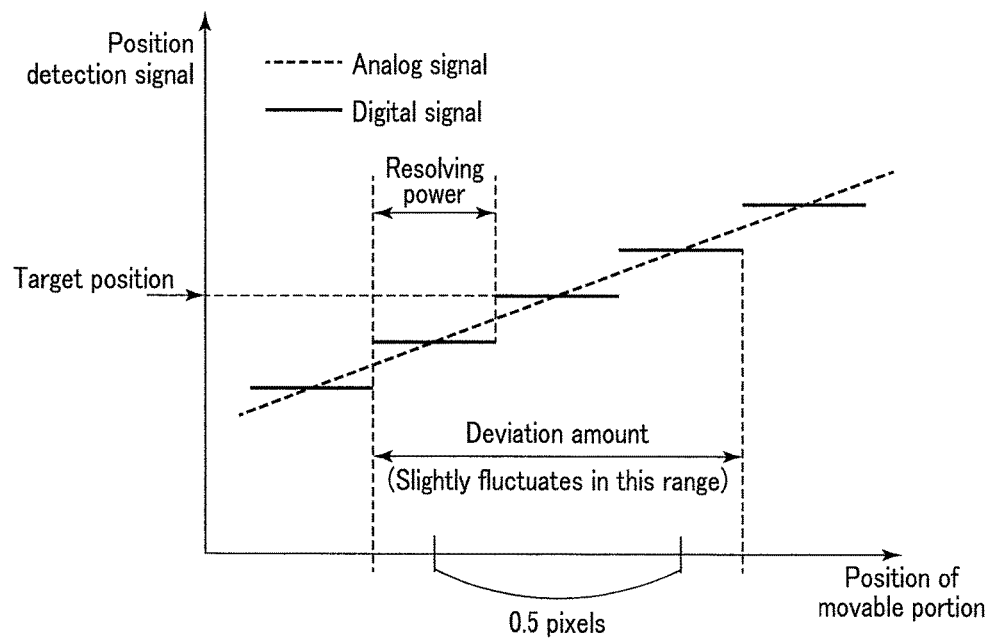
F I G. 10
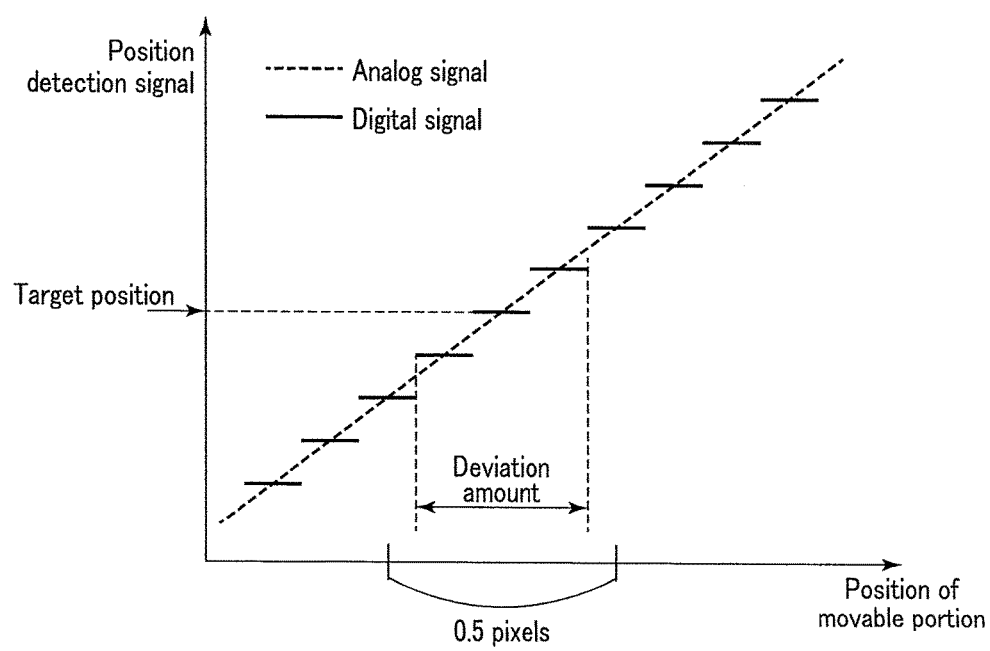
F I G. 11

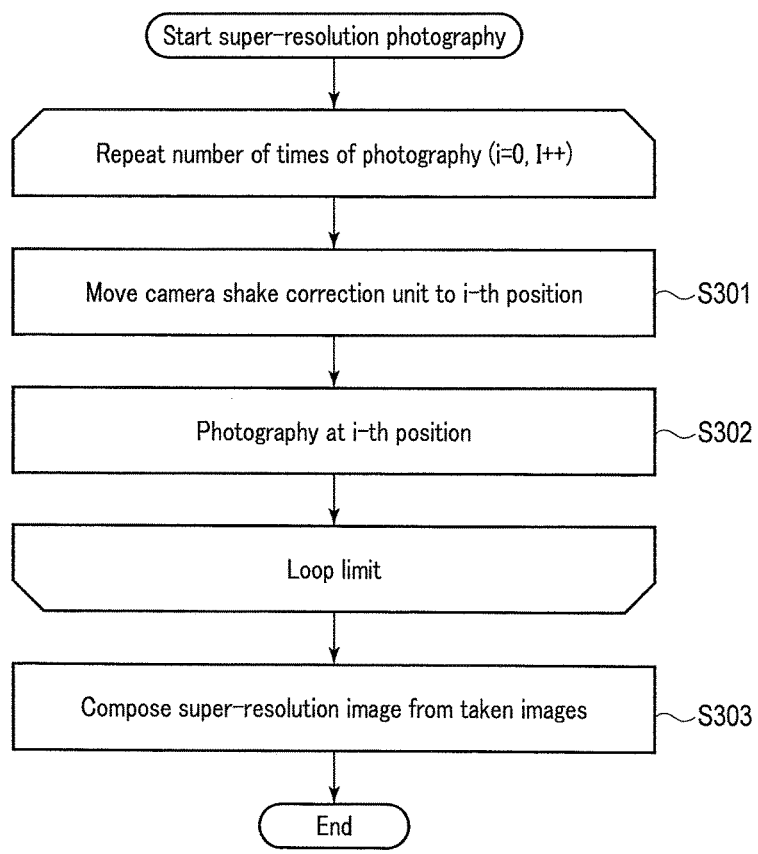
F I G. 12

IMAGING APPARATUS CAPABLE OF DETECTING POSITION OF MOVABLE IMAGE PICKUP DEVICE AT FIRST RESOLVING POWER AND AT SECOND RESOLVING POWER HIGHER THAN FIRST RESOLVING POWER AND, AT WHICH SECOND RESOLVING POWER, DEVIATION AMOUNT IS LESS THAN OR EQUAL TO PIXEL SHIFT AMOUNT

CROSS-REFERENCE TO RELATED APPLICATIONS

This application is a Continuation Application of PCT Application No. PCT/JP2015/070711, filed Jul. 21, 2015 and based upon and claiming the benefit of priority from the prior Japanese Patent Application No. 2015-030903, filed Feb. 19, 2015, the entire contents of both of which are incorporated herein by reference.

BACKGROUND OF THE INVENTION

1. Field of the Invention

The present invention relates to an imaging apparatus comprising a camera shake correction unit.

2. Description of the Related Art

There is known a camera shake correction unit which moves an image pickup device to reduce an image blur generated in a taken image due to, for example, a camera shake. In recent years, various suggestions have been made to use such a function of moving the image pickup device by the camera shake correction unit for purposes other than the camera shake correction. For example, an imaging apparatus suggested in Jpn. Pat. Appln. KOKAI Publication No. 2014-224940 corrects a camera shake and also obtains an optical low pass filter effect by moving an image pickup device and thereby changing the focus position of a subject image. The imaging apparatus according to Jpn. Pat. Appln. KOKAI Publication No. 2014-224940 superimposes a modulation signal representing a minute vibration component of the imaging apparatus on a position detection signal from a position detection section which detects the position of the imaging apparatus to generate a superimposition position signal, and controls the position of the image pickup device on the basis of the superimposition position signal so that the position of the image pickup device can be controlled with a high degree of accuracy.

BRIEF SUMMARY OF THE INVENTION

The camera shake correction unit can also be used in super-resolution photography. The super-resolution photography that uses the camera shake correction unit is processing to perform multiple exposures while shifting the image pickup device by a unit less than or equal to a pixel pitch, and composes taken images obtained by the multiple exposures to generate a super-resolution image. To perform such super-resolution photography, it is necessary to control the position of the image pickup device with an extremely high degree of accuracy. However, to perform the super-resolution photography by the technique according to Jpn. Pat. Appln. KOKAI Publication No. 2014-224940, it is necessary to increase the accuracy of a position detection system.

The present invention has been made in view of the above-mentioned circumstances, and an object of the present invention is to provide an imaging apparatus capable of accurately controlling the position of a camera shake correction unit to perform super-resolution photography without using an accurate position detection element.

According to an aspect of the invention, there is provided an imaging apparatus comprising: a camera shake correction unit which uses a coil and a magnet to move a movable portion including an image pickup device relative to a fixed portion; a position detection section which detects the position of the movable portion; a setting section which sets a resolving power of the detection of the position by the position detection section to a first resolving power or to a second resolving power which is a resolving power higher than the first resolving power and at which an amount of deviation from a target position is less than or equal to a pixel shift amount; a drive control section which, performs pixel shifts to move the movable portion with the second resolving power set by the setting section; and a photography control section which causes the image pickup device to perform exposures by timing of the pixel shifting and which composes images obtained by the exposures.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 2 shows a diagram of an assembly state of a camera shake correction unit;

FIG. 5 is a functional block diagram of the imaging apparatus according to one embodiment of the present invention;

FIG. 10 is a graph showing the relation between the actual position of the movable portion and the position detection signal when the position detection signal from the hall elements is amplified at a still image amplification factor;

FIG. 11 is a graph showing the relation between the actual position of the movable portion and the position detection signal when the position detection signal from the hall elements is amplified at a super-resolution amplification factor;

FIG. 12 is a flowchart showing processing for super-resolution photography;

DETAILED DESCRIPTION OF THE INVENTION

Figure 1:
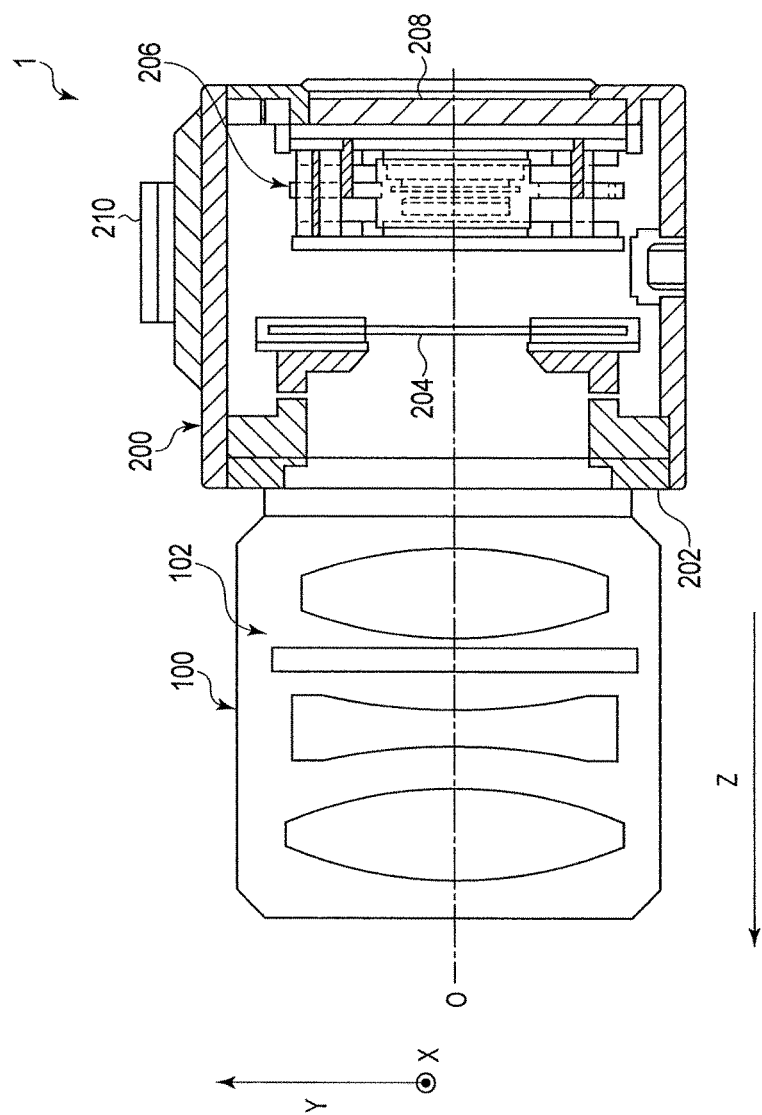
FIG. 1 is a diagram showing a schematic configuration of an imaging apparatus according to one embodiment of the present invention.

Hereinafter, an embodiment of the present invention will be described with reference to the drawings. FIG. 1 is a diagram showing a schematic configuration of an imaging apparatus according to the present embodiment. An imaging apparatus 1 shown in FIG. 1 includes an interchangeable lens 100 and a body 200. The interchangeable lens 100 is attached to the body 200 via a mount 202 provided in the body 200. When the interchangeable lens 100 is attached to the body 200, the interchangeable lens 100 and the body 200 are connected to each other to be able to communicate with each other. The interchangeable lens 100 and the body 200 cooperate to perform operations. The imaging apparatus 1 does not necessarily have to be a lens-interchangeable imaging apparatus. For example, the imaging apparatus 1 may be a lens-integrated imaging apparatus.

The interchangeable lens 100 includes an optical system 102. The optical system 102 includes, for example, lenses and a diaphragm, and brings a light flux from an unshown subject into a camera shake correction unit 206 of the body 200. Although the optical system 102 in FIG. 1 comprises the lenses, the optical system 102 may comprise one lens. The optical system 102 may include a focus lens, or may be configured as a zoom lens. In these cases, some of the lenses of the optical system 102 are configured to be movable along a Z-direction which is a direction along an optical axis O.

The body 200 includes a shutter 204, the camera shake correction unit 206, a monitor 208, and an operation section 210.

The shutter 204 is, for example, a focal plane shutter disposed in front of the camera shake correction unit 206 (on a positive side in the Z-direction). When opened, the shutter 204 exposes the camera shake correction unit 206. When closed, the shutter 204 shields the camera shake correction unit 206.

The camera shake correction unit 206 generates an image of the unshown subject by imaging the subject. The camera shake correction unit 206 moves a movable portion relative to a fixed portion by a voice coil motor (VCM) that uses a coil and a magnet, and thereby corrects an image blur that occurs in the taken image due to, for example, a camera shake. The configuration of the camera shake correction unit 206 will be described in detail later.

The monitor 208 is, for example, a liquid crystal display, and displays an image based on the taken image generated in the camera shake correction unit 206. The monitor 208 displays a menu screen for a user to perform various settings of the imaging apparatus 1. The monitor 208 may include a touch panel.

The operation section 210 is, for example, a release button. The release button is a button for the user to instruct to start photography by the imaging apparatus 1. The operation section 210 also includes various operation portions in addition to the release button.

Next, the configuration of the camera shake correction unit 206 is further described. FIG. 2 shows a diagram of an assembly state of the camera shake correction unit 206. As shown in FIG. 2, the camera shake correction unit 206 roughly comprises two fixed portions 301 and 302 and a movable portion 303 disposed between the fixed portions 301 and 302. In such a configuration, the camera shake correction unit 206 translates the movable portion 303 in a plane (an X-direction and a Y-direction in FIG. 3) perpendicular to the optical axis O. The camera shake correction unit 206 also moves the movable portion 303 in a rotation direction around the optical axis O.

Figure 3:
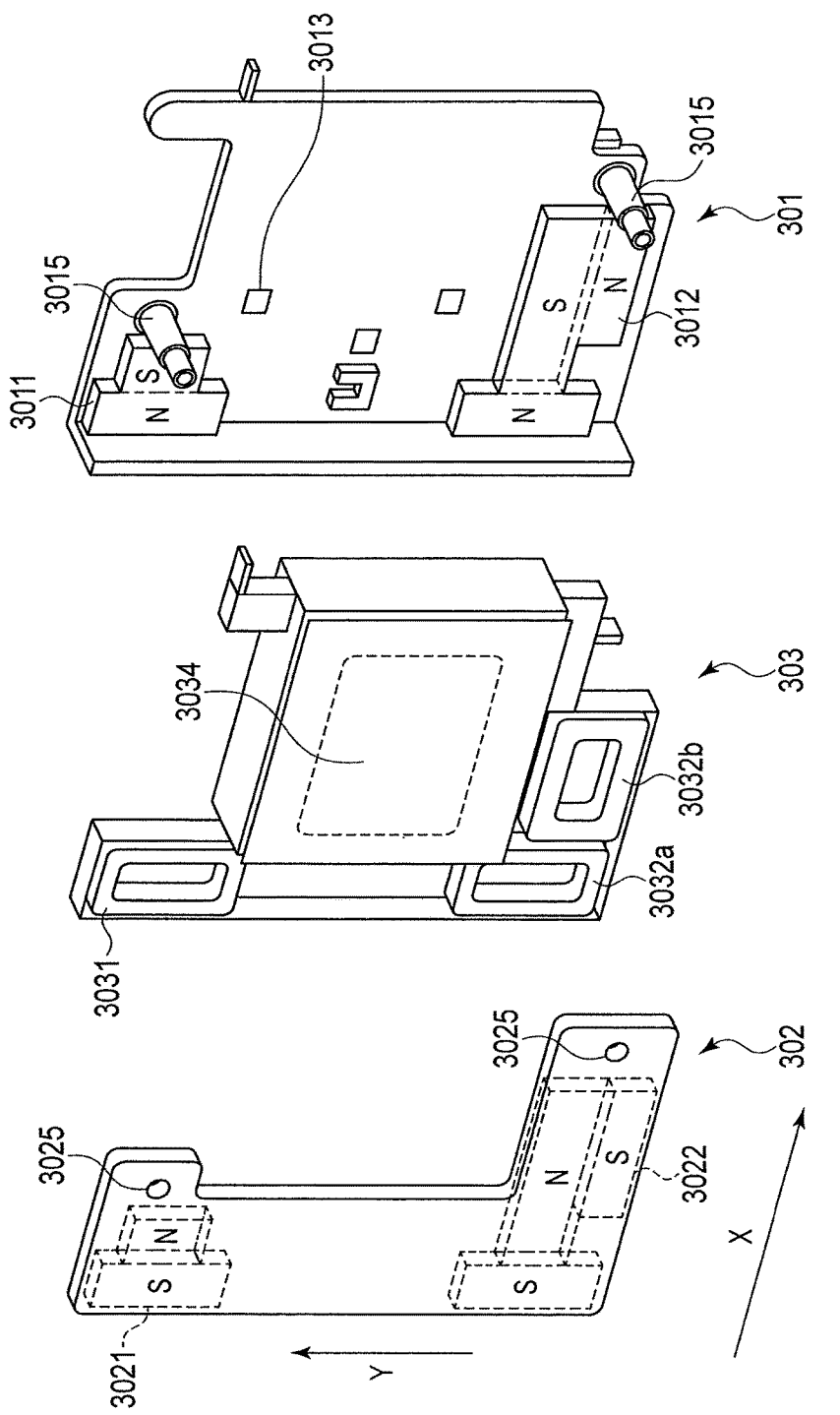
FIG. 3 is an exploded perspective view of the camera shake correction unit.

First, the configuration regarding the movement of the movable portion 303 in the camera shake correction unit 206 is described. FIG. 3 is an exploded perspective view of the camera shake correction unit 206. As shown in FIG. 3, the fixed portion 301 disposed on the side of the monitor 208 when seen from the movable portion 303 is a substantially rectangular plate member and is fixed to the body 200. A magnet 3011 for X-direction movement and a magnet 3012 for both X-direction and Y-direction movement are respectively adhesively bonded to the outer periphery of the fixed portion 301.

The magnet 3011 includes a first magnet which is in the shape of a rectangular parallelepiped having its longitudinal direction in the Y-direction and which is disposed so that its north pole faces toward the movable portion 303 and a second magnet which is in the shape of a rectangular parallelepiped having its length in the Y-direction that is the longitudinal direction shorter than that of the first magnet and which is disposed so that its south pole faces toward the movable portion 303. The second magnet of the fixed portion 301 is disposed adjacent to the center of the right surface of the first magnet when seen from the movable portion 303. The magnet 3012 includes a first magnet which is in the shape of a rectangular parallelepiped having its longitudinal direction in the Y-direction and which is disposed so that its north pole faces toward the movable portion 303 and a second magnet which is in the shape of a rectangular parallelepiped having its length in the Y-direction shorter than that of the first magnet and having its longitudinal direction in the X-direction and which is disposed so that its south pole faces toward the movable portion 303. The second magnet is disposed adjacent to the center of the right surface of the first magnet when seen from the movable portion 303.

The magnet 3012 includes a third magnet which is in the shape of a rectangular parallelepiped having its length in the X-direction that is the longitudinal direction shorter than that of the second magnet and which is disposed so that its north pole faces toward the movable portion 303. The third magnet is disposed on the lower surface of the second magnet when seen from the movable portion 303. That is, the second magnet that constitutes the magnet 3012 is combined with the first magnet function as a magnet for X-direction movement, and is combined with the third magnet to function as a magnet for Y-direction movement.

The fixed portion 302 disposed on the side of the shutter 204 when seen from the movable portion 303 is a substantially L-shaped plate member in which an opening for holding an image pickup device unit 3034 in the movable portion 303 is formed. A magnet 3021 for X-direction movement and a magnet 3022 for both X-direction and Y-direction movement are respectively adhesively bonded to the positions of the fixed portion 302 corresponding to the magnets 3011 and 3012 of the fixed portion 301. The magnet 3021 has the same configuration as that of the magnet 3011, and is disposed so that a different pole faces toward the magnet 3011. The magnet 3022 has the same configuration as that of the magnet 3012, and is disposed so that a different pole faces toward the magnet 3012.

The movable portion 303 is a substantially L-shaped plate member in which an opening for mounting the image pickup device unit 3034 similar to that of the fixed portion 302 is formed. Coils 3031 and 3032*a* for X-direction movement and a coil 3032*b* for Y-direction movement are disposed in the outer periphery of the movable portion 303. The coil 3031 is disposed at a position corresponding to the magnet 3011 and the magnet 3021 in a plate-shaped portion of the movable portion 303 extending in the Y-direction. The coil 3032*a* is disposed at a position corresponding to the first magnet and the second magnet of the magnet 3012 and the magnet 3022 in the plate-shaped portion of the movable portion 303 extending in the Y-direction. The coil 3032*b* is disposed at a position corresponding to the second magnet and the third magnet of the magnet 3012 and the magnet 3022 in the plate-shaped portion of the movable portion 303 extending in the X-direction.

The image pickup device unit 3034 is mounted in the opening of the movable portion 303. The image pickup device unit 3034 is a unit including an image pickup device and its control circuit. The image pickup device unit 3034 in the present embodiment includes the image pickup device, a signal processing section, an A/D conversion section, and an image processing section. The image pickup device images the subject to generate an image signal regarding the subject. The signal processing section subjects the image signal to analog processing such as amplification processing. The A/D conversion section converts, into a digital signal, the image signal processed in the signal processing section. The image processing section subjects the image signal to image processing to generate an image. The image processing section also composes multiple images to generate a super-resolution image.

Two screw receivers 3015 are formed in the fixed portion 301, and screw receiver holes 3025 are formed in the parts of the fixed portion 302 corresponding to the screw receivers 3015. The fixed portion 302 is screwed so that the movable portion 303 is put between the fixed portion 301 and the fixed portion 302. In this instance, the coil 3031, the coils 3032*a* and 3032*b*, the magnet 3011, the magnet 3012, the magnet 3021, and the magnet 3022 are out of contact to maintain a predetermined space therebetween.

In such a configuration, if the application of electricity to one of the coils 3031, 3032*a*, and 3032*b* is started, the movable portion 303 becomes afloat between the fixed portion 301 and the fixed portion 302. The intensity of a drive electric current to apply electricity to the coils 3031, 3032*a*, and 3032*b* in this state is controlled so that the movable portion 303 is translated or rotated.

Figure 4:
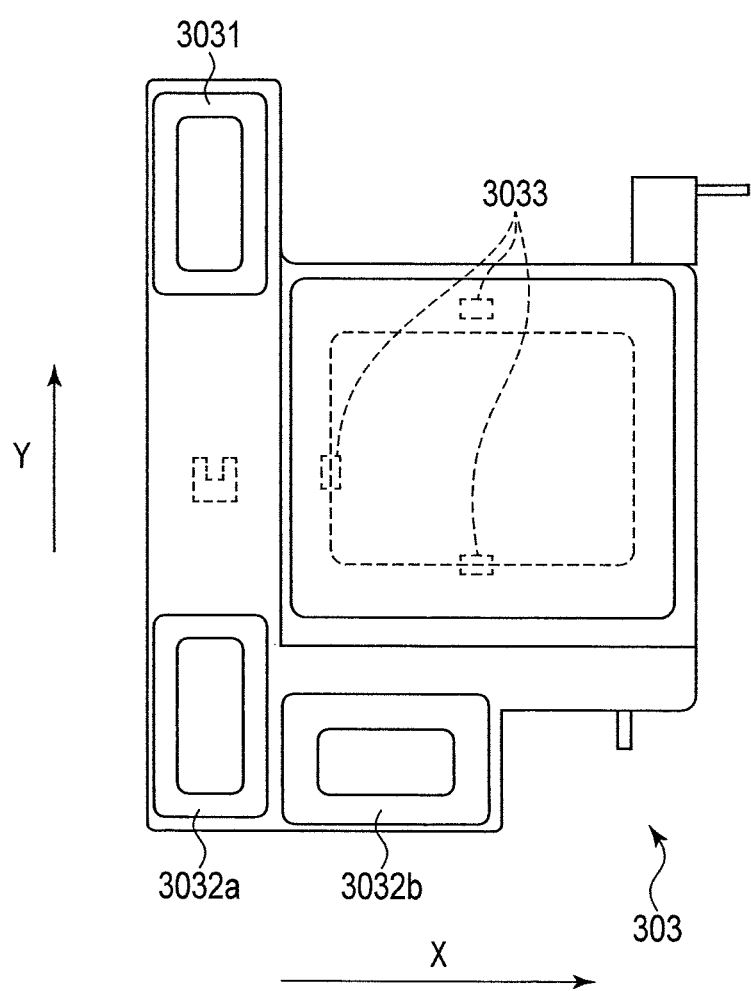
FIG. 4 is a diagram showing the location of a hall element in a movable portion.

Next, the configuration regarding the position detection of the movable portion 303 is described. Three position detection magnets 3013 are disposed in the fixed portion 301. One of the position detection magnets 3013 is disposed in the upper part of the fixed portion 301. One of the position detection magnets 3013 is disposed in the lower part of the fixed portion 301. One of the position detection magnets 3013 is disposed in the left part of the fixed portion 301. Moreover, as shown in FIG. 4, three hall elements 3033 are provided at the positions on the rear surface of the movable portion 303 corresponding to the position detection magnets 3013. The position detection magnet 3013 provided in the upper part of the fixed portion 301 and the hall element 3033 provided in the upper part of the movable portion 303 detect in pairs a first displacement amount of the movable portion 303 in the X-direction as a change amount of a magnetic field. The position detection magnet 3013 provided in the lower part of the fixed portion 301 and the hall element 3033 provided in the lower part of the movable portion 303 detect in pairs a second displacement amount of the movable portion 303 in the X-direction as a change amount of the magnetic field. The position detection magnet 3013 provided in the left part of the fixed portion 301 and the hall element 3033 provided in the left part of the movable portion 303 detect in pairs a displacement amount of the movable portion 303 in the Y-direction as a change amount of the magnetic field. The position of the movable portion 303 is detected by the difference of the signals detected by the respective hall elements 3033.

FIG. 5 is a functional block diagram of the imaging apparatus 1 according to the present embodiment. The imaging apparatus 1 according to the present embodiment performs a camera shake correction, normal still image photography, and super-resolution photography. The camera shake correction is processing to move the movable portion 303 to inhibit an image blur that occurs in the image due to, for example, camera shake. The normal still image photography is processing to perform one exposure to obtain one taken image. The super-resolution photography is processing to perform multiple exposures while shifting the movable portion 303 by a pixel shift amount less than or equal to a pixel pitch, and composes images obtained by the multiple exposures to obtain an image higher in resolution than the original number of pixels of the image pickup device.

As shown in FIG. 5, the imaging apparatus 1 has, as functional blocks, the camera shake correction unit 206, a position detection section 402, a camera shake detection section 404, a photography control section 406, a target position generation section 408, a subtraction section 410, a drive control section 412, a determination section 414, and a setting section 416. Among these functional blocks, the photography control section 406, the target position generation section 408, the subtraction section 410, the drive control section 412, the determination section 414, and the setting section 416 comprise CPUs and ASICs.

The position detection section 402 amplifies a position detection signal from the hall elements 3033 of the camera shake correction unit 206, acquires the amplified position detection signal as a digital signal to generate a present position signal indicating the position of the movable portion 303, and outputs the generated present position signal to the subtraction section 410.

The camera shake detection section 404 detects the amount of a camera shake that has occurred in the body 200 of the imaging apparatus 1, and outputs a signal corresponding to the detected amount of the camera shake. For example, the camera shake detection section 404 detects a camera shake amount by an angular velocity sensor. The camera shake detection section 404 also detects a camera shake amount from the movement of the subject in the image generated in the camera shake correction unit 206.

The photography control section 406 controls the driving of the image pickup device of the camera shake correction unit 206. The photography control section 406 also outputs, to the target position generation section 408, a signal indicating whether to perform a camera shake correction and/or super-resolution photography. When performing the super-resolution photography, the photography control section 406 indicates, to the target position generation section 408, a signal representing a predetermined target position for each exposure for super-resolution photography. The photography control section 406 also indicates, to the setting section 416, whether to perform the normal still image photography or the super-resolution photography.

The target position generation section 408 generates a target position signal indicating a target position to be the target of the position control of the movable portion 303, and outputs the generated target position signal to the subtraction section 410. When the camera shake correction is performed, the target position generation section 408 generates a target position signal on the basis of a camera shake correction signal based on a signal corresponding to the camera shake amount from the camera shake detection section 404. When the super-resolution photography is performed, the target position generation section 408 generates a target position signal on the basis of a signal indicating a target position from the photography control section 406. When both the camera shake correction and the super-resolution photography are performed, the target position generation section 408 combines (adds) the camera shake correction signal from the camera shake detection section 404 and the signal corresponding to the target position from the photography control section 406 to generate a target position signal.

The subtraction section 410 outputs a deviation signal of the target position signal generated in the target position generation section 408 and the present position signal generated in the position detection section 402 to the drive control section 412.

The drive control section 412 generates drive currents to be supplied to the coils 3031, 3032a, and 3032b of the camera shake correction unit 206 on the basis of the deviation signal output from the subtraction section 410, and supplies the generated drive currents to the coils 3031, 3032a, and 3032b and thereby moves the movable portion 303.

The determination section 414 determines whether a camera shake has occurred in the body of the imaging apparatus 1 in accordance with the camera shake amount detected in the camera shake detection section 404, and outputs a signal indicating this determination result to the photography control section 406 and the setting section 416.

The setting section 416 sets a resolving power of position detection in the position detection section 402. When the normal still image photography is performed, the setting section 416 sets the resolving power of position detection in the position detection section 402 to a predetermined first resolving power. In contrast, when the super-resolution photography is performed, the setting section 416 sets the resolving power of position detection in the position detection section 402 to a second resolving power which is determined in accordance with the pixel pitch of the image pickup device.

Figure 6:
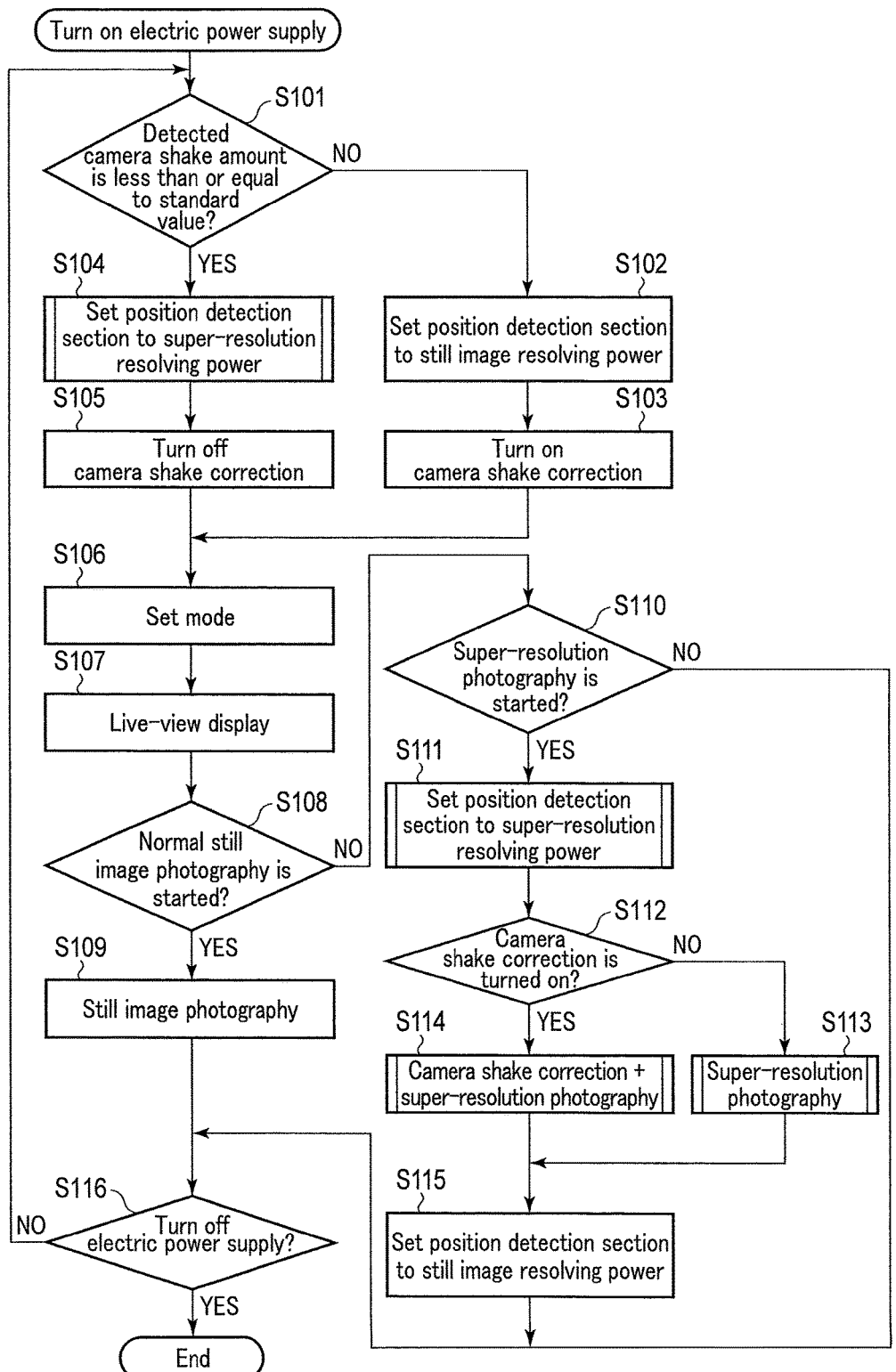
FIG. 6 is a flowchart showing the operation of the imaging apparatus according to one embodiment of the present invention.

The operation of the imaging apparatus 1 is described below. FIG. 6 is a flowchart showing the operation of the imaging apparatus 1. The processing in FIG. 6 is started when the electric power supply of the imaging apparatus 1 is turned on.

In step S101, the determination section 414 determines whether the camera shake amount detected in the camera shake detection section 404 is less than or equal to a standard value. This standard value is a value of a camera shake amount such that an image blur is considered to have occurred, and is previously stored in the determination section 414. When it is determined in step S101 that the camera shake amount detected in the camera shake detection section 404 is not less than or equal to the standard value, the processing moves to step S102. When it is determined in step S101 that the camera shake amount detected in the camera shake detection section 404 is less than or equal to the standard value, the processing moves to step S104.

In step S102, the setting section 416 sets the resolving power of position detection in the position detection section 402 to a still image resolving power which is the first resolving power. Here, the resolving power in the present embodiment refers to a unit length [µm/LSB] indicated by the least significant bit of a signal loaded as digital data from each of the hall elements 3033 of the camera shake correction unit 206. The still image resolving power is a resolving power in a normal still image photography mode, and, for example, a resolving power stored as a fixed value in the setting section 416 is used.

In step S103, the photography control section 406 turns on a camera shake correction mode. The processing then moves to step S106. When it is determined in step S101 that the camera shake amount is more than the standard value, that is, that a great image blur has occurred, the camera shake correction mode is turned on. As a result, the image blur that occurs in the image is reduced.

In step S104, the setting section 416 sets the resolving power of position detection in the position detection section 402 to a super-resolution resolving power which is the second resolving power. The super-resolution resolving power is a resolving power which is changed by the pixel pitch of the image pickup device. The processing for setting the super-resolution resolving power will be described in detail later.

In step S105, the photography control section 406 turns off the camera shake correction mode. The processing then moves to step S106. When it is determined in step S101 that the camera shake amount is not more than the standard value, that is, that no image blur has occurred, the camera shake correction mode is turned off.

In step S106, the photography control section 406 sets a photography mode. The photography mode includes the normal still image photography mode for performing the normal still image photography and a super-resolution photography mode for performing the super-resolution photography. One of the modes is set by, for example, a user's operation on the menu screen displayed on the monitor 208.

In step S107, the photography control section 406 starts the driving of the image pickup device of the camera shake correction unit 206 to perform a live-view display. The photography control section 406 then sequentially, displays, on the monitor 208, the images obtained in the camera shake correction unit 206.

In step S108, the photography control section 406 determines whether an instruction to start the normal still image photography has been issued. That is, the photography control section 406 determines whether the present photography mode is the normal still image photography mode and whether an instruction to start photography has been issued by the user. The instruction to start photography is an operation of depressing the release button or a touch release operation. When it is determined in step S108 that the instruction to start the normal still image photography has been issued, the processing moves to step S109. When it is determined in step S108 that the instruction to start the normal still image photography has not been issued, the processing moves to step S110.

In step S109, the photography control section 406 starts the driving of the image pickup device of the camera shake correction unit 206 to perform the normal still image photography. The photography control section 406 then records the image obtained in the camera shake correction unit 206 in an unshown recording medium. The processing then moves to step S116. Although not described, the camera shake correction is performed together with the normal still image photography when the camera shake correction mode is on.

In step S110, the photography control section 406 determines whether an instruction to start the super-resolution photography has been issued. That is, the photography control section 406 determines whether the present photography mode is the super-resolution photography mode and whether an instruction to start photography has been issued by the user. As in the normal still image photography, the instruction to start photography is the operation of depressing the release button or the touch release operation. When it is determined in step S110 that the instruction to start the super-resolution photography has been issued, the processing moves to step S111. When it is determined in step S110 that the instruction to start the super-resolution photography has not been issued, the processing moves to step S116.

In step S111, the setting section 416 sets the resolving power of position detection in the position detection section 402 to the super-resolution resolving power which is the second resolving power. The processing for setting the super-resolution resolving power will be described in detail later.

In step S112, the photography control section 406 determines whether the camera shake correction mode is on at present. When it is determined in step S112 that the camera shake correction mode is not on, the processing moves to step S113. When it is determined in step S112 that the camera shake correction mode is on, the processing moves to step S114.

In step S113, the photography control section 406 performs the super-resolution photography. The processing of the super-resolution resolving power will be described in detail later. After the end of the super-resolution photography, the processing moves to step S115.

In step S114, the photography control section 406 performs the super-resolution photography involving the camera shake correction. The processing of the super-resolution photography involving the camera shake correction will be described in detail later. After the end of the super-resolution photography involving the camera shake correction, the processing moves to step S115.

In step S115, the setting section 416 sets the resolving power of position detection in the position detection section 402 to the still image resolving power which is the first resolving power. The processing then moves to step S116.

In step S116, the photography control section 406 determines whether the electric power supply of the imaging apparatus 1 has been turned off. When it is determined in step S116 that the electric power supply of the imaging apparatus 1 has not been turned off, the processing returns to step S101. When it is determined in step S116 that the electric power supply of the imaging apparatus 1 has been turned off, the processing in FIG. 6 ends.

Figure 7:
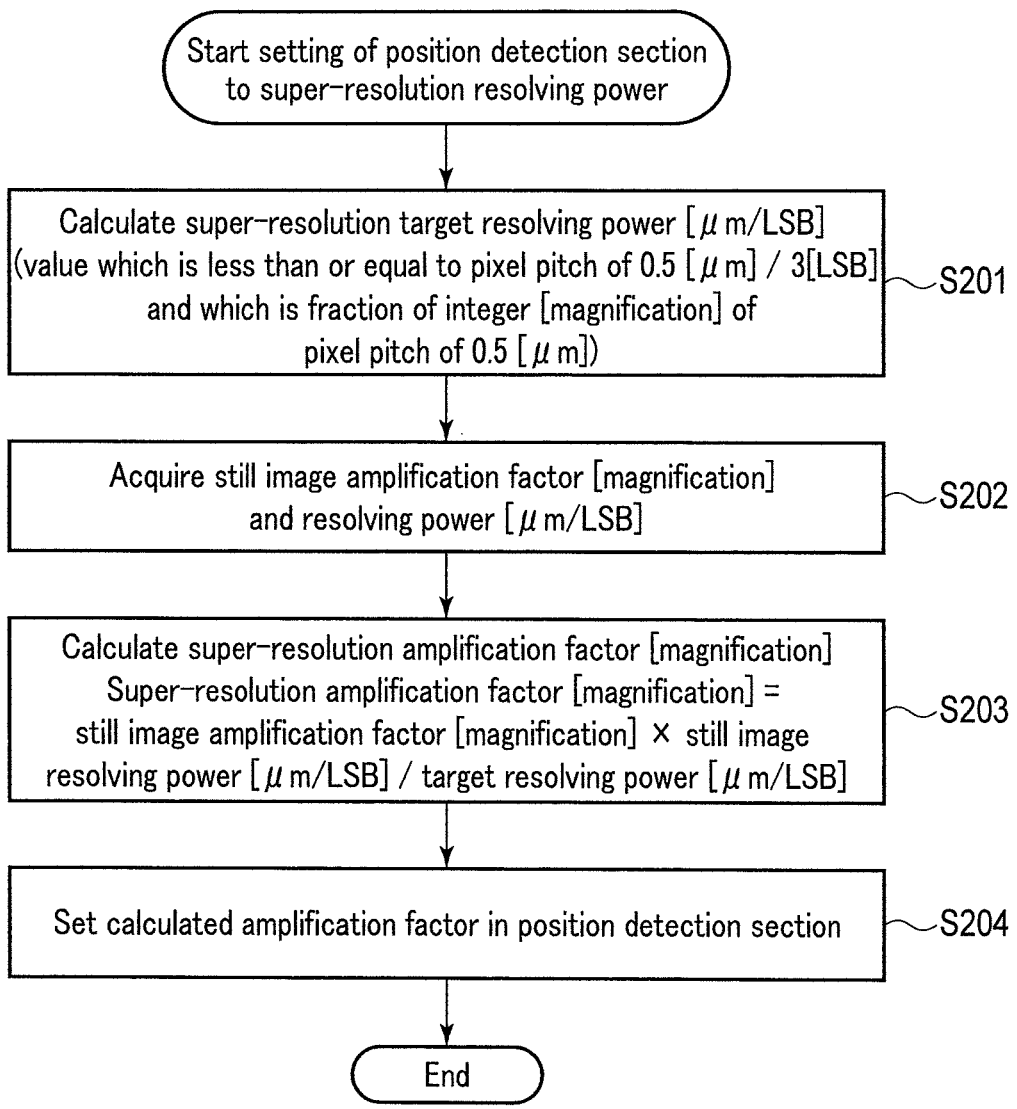
FIG. 7 is a flowchart showing processing for setting super-resolution resolving power.

Next, the processing for setting the super-resolution resolving power is described. FIG. 7 is a flowchart showing the processing for setting the super-resolution resolving power. The processing in FIG. 7 can be applied to both step S104 and step S111.

In step S201, the setting section 416 calculates a super-resolution target resolving power. The calculation of the super-resolution target resolving power is described below.

Figure 8:
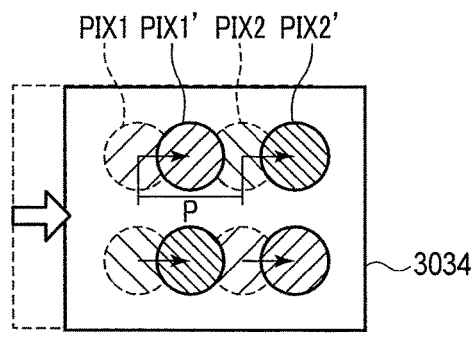
FIG. 8 is a diagram showing the concept of pixel shifting.

FIG. 8 shows the concept of pixel shifting according to the present embodiment. In FIG. 8, the pixel pitch is an opening-inter-central distance P between a pixel PIX1 and a pixel PIX2 that are adjacent to each other. The pixel shifting is processing for shifting the position of the movable portion 303 (image pickup device) by a pixel shift amount within the pixel pitch. Thus, the pixel shift amount has a relation: 0<pixel shift amount<pixel pitch. For example, the pixel shifting in which the pixel shift amount is a pixel pitch of 0.5 is processing for shifting the pixel PIX1 and the pixel PIX2 by a pixel pitch of 0.5 in a predetermined direction (rightward direction in FIG. 8) to produce a pixel PIX1' and a pixel PIX2'.

When the position of the movable portion 303 is controlled by the VCM, the amount of deviation of the movable portion 303 from the target position is equal to or more than three times the resolving power of the detection of the position by the position detection section 402. This is because the movable portion 303 slightly vibrates due to the operating principle of the VCM. The position deviates from the target position in each of the positive and negative directions due to the vibration, so that the amount of deviation of the movable portion 303 from the target position is equal to or more than three times the resolving power of the detection of the position by the position detection section 402.

Figure 9:
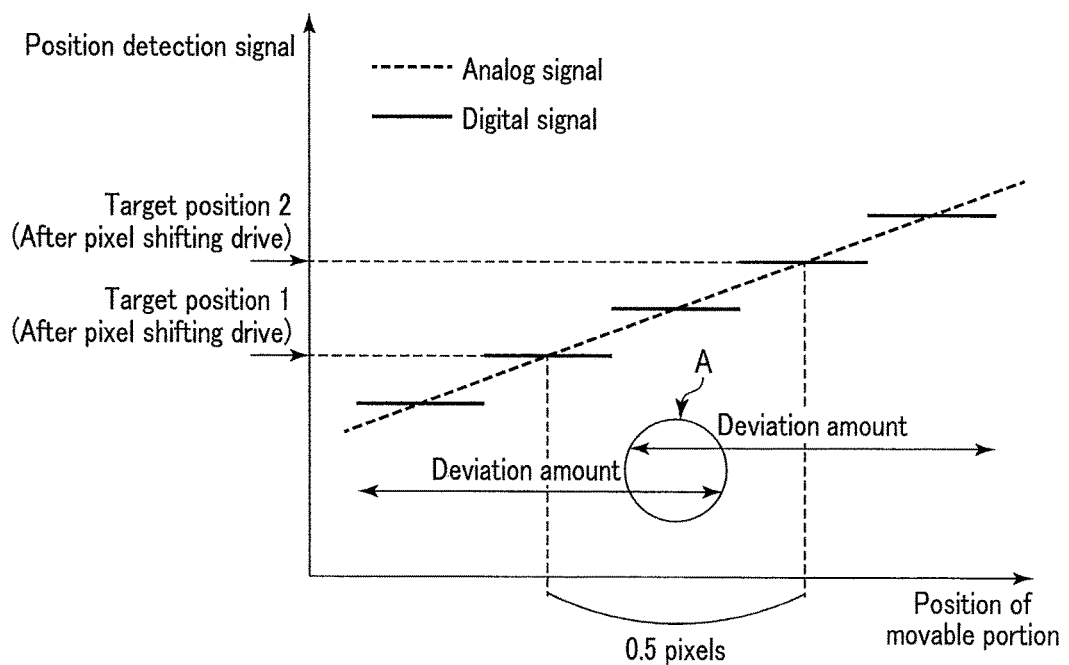
FIG. 9 is a graph showing the change of a position detection signal when the movable portion is moved from a predetermined target position 1 to another target position 2 which is 0.5 pixel pitches away.

FIG. 9 is a graph showing the change of the position detection signal when the movable portion 303 is moved from a predetermined target position 1 to another target position 2 which is 0.5 pixel pitch away. Even if a position detection signal indicating that the position of the movable portion 303 is the target position 1 is output, the actual position of the movable portion 303 changes within a deviation amount 1 in FIG. 9 due to a deviation that occurs when the movable portion 303 is moved by the VCM. If photography is performed in this state, an image will be an image taken at any position within the deviation amount 1 from the target position 1.

Similarly, even if a position detection signal indicating that the position of the movable portion 303 is the target position 2 is output, the actual position of the movable portion 303 changes within a deviation amount 2 in FIG. 9. If photography is performed in this state, an image will be an image taken at any position within the deviation amount 2 from the target position 2.

When the deviation amount is greater than the pixel shift amount, the positions of the movable portion 303 overlap as indicated in a part A in FIG. 9, so that the actual position of the movable portion 303 may be reversed before and after the pixel shifting. If two exposures are performed while the position of the movable portion 303 is reversed, an image in which the image pickup device is located at the pixel PIX1' and the pixel PIX2' is acquired in the first exposure, and an image in which the image pickup device is located at the pixel PIX1 and the pixel PIX2 is acquired in the next exposure. If such images are composed, the resolving power in a super-resolution image to be finally obtained deteriorates.

Therefore, according to the present embodiment, the super-resolution target resolving power (the resolving power of the detection of the position by the position detection section 402 in the super-resolution photography) is set so that the deviation amount may be smaller than the pixel shift amount. Specifically, the super-resolution resolving power is less than or equal to ⅓ of the pixel shift amount. Thus, even if a deviation which is equal to or more than three times the resolving power has been made from the target position of the movable portion 303 as a result of the movement of the VCM, the actual position of the movable portion 303 can be within the pixel pitch.

Furthermore, to finally move the movable portion 303 to a correct target position, it is necessary that the super-resolution target resolving power be a fraction of the integer of the pixel shift amount. Therefore, the setting section 416 sets the super-resolution resolving power to be less than or equal to ⅓ of the pixel shift amount and to be a fraction of the integer of the pixel shift amount. When the pixel shift amount is a pixel pitch of 0.5, the setting section 416 sets, for example, the super-resolution resolving power to 0.5 pixel pitch/3 [μm/LSB]. Since there is a possibility that the deviation amount may be more than three times the resolving power of the detection of the position, the super-resolution resolving power is preferably a fraction of the integer more than a pixel shift amount of 4.

Here, the explanation returns to FIG. 7. In step S202, the setting section 416 respectively acquires a still image amplification factor and a still image resolving power. The still image amplification factor is an amplification factor of the position detection signal from the hall elements 3033 by the position detection section 402 in the normal still image photography mode. For example, an amplification factor stored in the position detection section 402 as a fixed value is used.

In step S203, the setting section 416 calculates a super-resolution amplification factor. The super-resolution amplification factor is an amplification factor of the position detection signal from the hall elements 3033 by the position detection section 402 in the super-resolution photography mode. For example, the super-resolution amplification factor is calculated as follows.

(Super-resolution amplification factor [magnification])=(still image amplification factor [magnification])×(still image resolving power [μm/LSB])/(super-resolution target resolving power [μm/LSB])

FIG. 10 is a graph showing the relation between the actual position of the movable portion 303 and the position detection signal when the position detection signal from the hall elements 3033 is amplified at the still image amplification factor. In contrast, FIG. 11 is a graph showing the relation between the actual position of the movable portion 303 and the position detection signal when the position detection signal from the hall elements 3033 is amplified at the super-resolution amplification factor. As obvious from the above equation, the super-resolution amplification factor is higher in value than the still image amplification factor. If the position detection signal is amplified at such a super-resolution amplification factor, the deviation amount can be less than or equal to the pixel shift amount. As a result, a super-resolution image that is high in resolution can be generated.

In step S204, the setting section 416 sets the calculated super-resolution amplification factor in the position detection section 402. The processing in FIG. 7 then ends.

Next, the processing for the super-resolution photography is described. FIG. 12 is a flowchart showing the processing for the super-resolution photography.

Figure 13A:
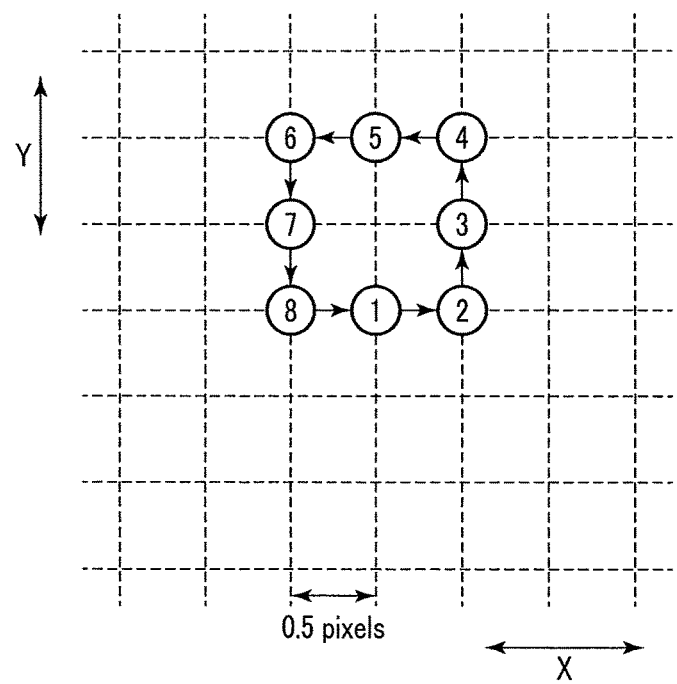
FIG. 13A is a graph showing an example of a target position of the super-resolution photography.
Figure 13B:
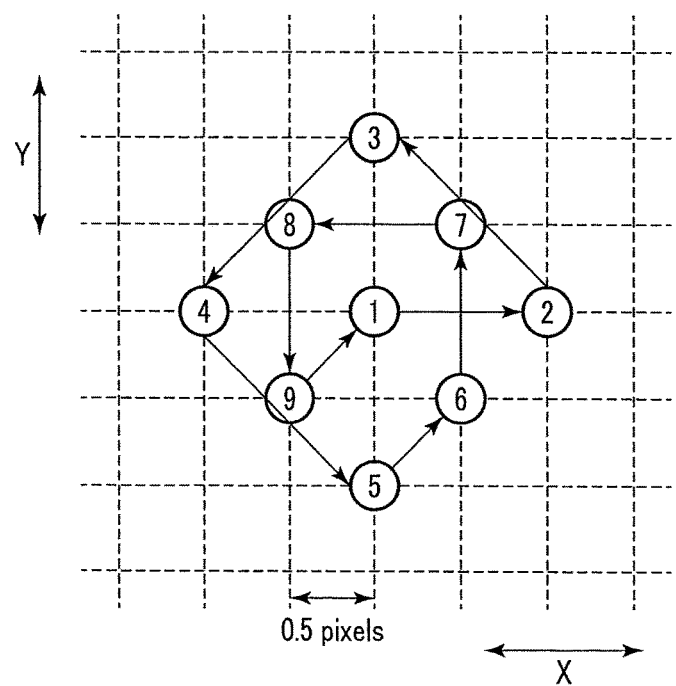
FIG. 13B is a graph showing an example of a target position of the super-resolution photography.

The photography control section 406 performs loop processing for repeating i times of exposures for super-resolution photography. First, in step S301, the photography control section 406 indicates a target position to the target position generation section 408 to move the movable portion 303 of the camera shake correction unit 206 to the i-th position. Accordingly, the target position generation section 408 generates a target position signal. The drive control section 412 then moves the movable portion 303 to the target position in accordance with a drive signal generated on the basis of a deviation signal of the target position signal and the present position signal. Here, for example, a preset fixed value is used for the target position of the super-resolution photography. FIG. 13A and FIG. 13B show an example of the target position of the super-resolution photography. In the example of FIG. 13A, the movable portion 303 is moved 8 times in a quadrate shape from an initial position 1 (corresponding to i=0). In this example, 8 target positions of i=0 to i=7 are set. In contrast, in the example of FIG. 13B, an oblique movement of the movable portion 303 is also included, and the movable portion 303 is moved 9 times from the initial position 1. In this example, 9 target positions of i=0 to i=8 are set. The settings in FIG. 13A and FIG. 13B are illustrative only. How to set target positions is not particularly limited as long as upward, downward, leftward, rightward, and oblique movements are combined.

In step S302, the photography control section 406 starts the driving of the image pickup device of the camera shake correction unit 206. The photography control section 406 then records the image obtained in the camera shake correction unit 206 in an unshown RAM. If i exposures have not been finished, i is incremented, and the processing returns to step S301 where the loop starts. If i exposures have been finished, the processing moves to step S303.

In step S303, the image processing section of the camera shake correction unit 206 composes i images obtained by the i exposures to generate a super-resolution image. The processing in FIG. 12 then ends.

Figure 14:
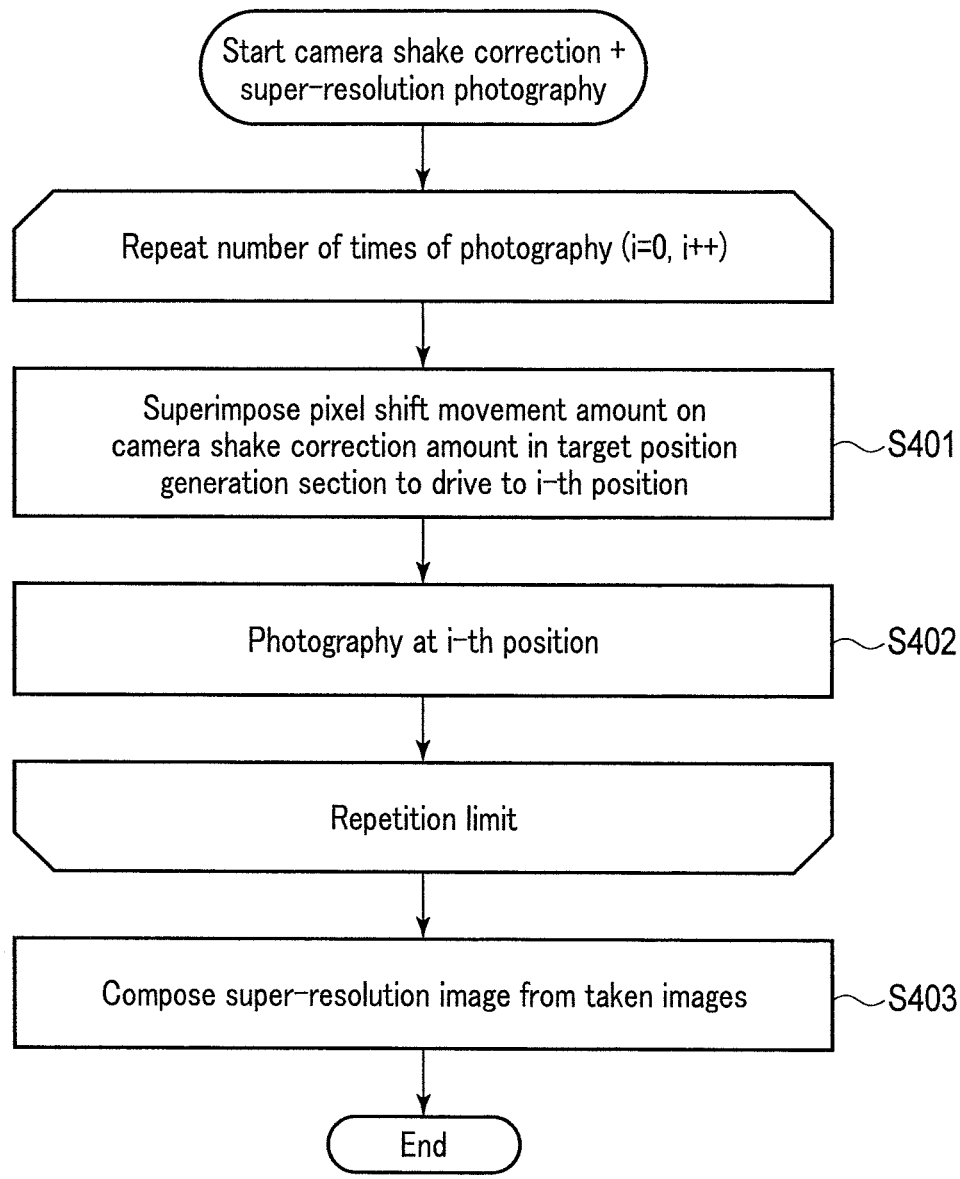
FIG. 14 is a flowchart showing processing for super-resolution photography involving a camera shake correction.

Next, the super-resolution photography involving the camera shake correction is described. FIG. 14 is a flowchart showing the processing for the super-resolution photography involving the camera shake correction.

The photography control section 406 performs loop processing for repeating i exposures for super-resolution photography. First, in step S401, the photography control section 406 indicates a target position to the target position generation section 408 to move the movable portion 303 of the camera shake correction unit 206 to the i-th position. In contrast, when the camera shake correction mode is on, the camera shake detection section 404 outputs a signal corresponding to a camera shake amount to the target position generation section 408. The target position generation section 408 combines the camera shake correction signal based on the signal corresponding to the camera shake amount from the camera shake detection section 404 and the signal corresponding to the target position from the photography control section 406 to generate a target position signal. The drive control section 412 then moves the movable portion 303 to the target position in accordance with the drive signal generated on the basis of the deviation signal of the target position signal and the present position signal. The drive signal generated in step S401 takes the camera shake amount into consideration. Therefore, even if a camera shake or the like occurs and even if a high-precision position detection element is not used, it is possible to correctly move the movable portion 303 to the target position.

In step S402, the photography control section 406 starts the driving of the image pickup device of the camera shake correction unit 206. The photography control section 406 then records the image obtained in the camera shake correction unit 206 in the unshown RAM. If i exposures have not been finished, i is incremented, and the processing returns to step S401 where the loop starts. If i exposures have been finished, the processing moves to step S403.

In step S403, the image processing section of the camera shake correction unit 206 composes i images obtained by the i exposures to generate a super-resolution image. The processing in FIG. 14 then ends.

As described above, according to the present embodiment, the resolving power of the detection of the position by the position detection section 402 in the super-resolution photography mode is a resolving power such that the amount of deviation of the movable portion 303 from the target position is less than or equal to the pixel shift amount. Thus, the accuracy of the position control for the movable portion 303 can be improved, and each exposure in the super-resolution photography mode can be performed in a situation where the position of the movable portion 303 is an accurate position. Therefore, and even if a high-precision position detection element is not used, it is possible to generate a super-resolution image having high resolution.

While the present invention has been described above in connection with the embodiment, it should be understood that the present invention is not limited to the embodiment described above, and various modifications and applications can be made within the spirit of the present invention. For example, the above-described configuration of the camera shake correction unit 206 is one example and can be suitably changed. For example, the configuration of the VCM may be different. In the embodiment described above, the super-resolution target resolving power is calculated whenever the electric power supply of the imaging apparatus 1 is turned on. The super-resolution target resolving power can be set if the pixel pitch of the image pickup device is determined. Therefore, the super-resolution target resolving power may be calculated at the time of the manufacture of the imaging apparatus 1 and then stored in the setting section 416, and subsequently, the stored super-resolution target resolving power may be used.

Each process according to the embodiment described above may be stored as a program executable by, for example, a CPU or the like as a computer. Otherwise, each process can be stored and distributed in a storage medium of an external storage device such as a memory card, a magnetic disk, an optical disk, or a semiconductor memory. The CPU or the like can then read the program stored in the storage medium of the external storage device, and execute the above-described processes when the operation of the CPU or the like is controlled by the read program.

What is claimed is:

1. An imaging apparatus comprising:
   a camera shake correction unit which uses a coil and a magnet to move a movable portion including an image pickup device relative to a fixed portion;
   a position detection sensor which outputs a signal for detecting a position of the movable portion; and
   at least one processor or circuit which is configured to:
      set a resolving power for detection of the position based on the signal output by the position detection sensor to a first resolving power or to a second resolving power which is a resolving power higher than the first resolving power;
      perform pixel shifts to move the movable portion with the set second resolving power; and
      cause the image pickup device to perform exposures by timing of the pixel shifting and generate images obtained by the exposures,
   wherein the second resolving power is set so that a deviation amount from a target position is less than or equal to a pixel shift amount.

2. The imaging apparatus according to claim 1, wherein a movement amount of the movable portion is an amount corresponding to the pixel shift amount, and the second resolving power is set to be a fraction of an integer of the pixel shift amount.

3. The imaging apparatus according to claim 1, wherein a deviation amount when the resolving power is set to the first resolving power is equal to or more than three times the first resolving power, and the deviation amount when the resolving power is set to the second resolving power is equal to or more than three times the second resolving power.

4. The imaging apparatus according to claim 3, wherein the processor or circuit sets the resolving power of the detection of the position to the second resolving power at a start of photography in a super-resolution photography mode to acquire a super-resolution image.

5. The imaging apparatus according to claim 1, wherein the processor or circuit is further configured to:
   determine whether to correct a camera shake based on a detected amount of camera shake, and
   set the resolving power of the detection of the position to the second resolving power when the camera shake is not corrected.

6. The imaging apparatus according to claim 5, further comprising an angular velocity sensor to detect the amount of camera shake.

7. The imaging apparatus according to claim 5, wherein the processor or circuit is configured to detect the amount of camera shake based on movement of a subject in at least one of the generated images.

8. The imaging apparatus according to claim 1, wherein the processor or circuit is further configured to set a movement amount of the movable portion based on a detected amount of camera shake and the pixel shift amount, and
   set the second resolving power so that the deviation amount from the set target position is less than or equal to the pixel shift amount.

9. The imaging apparatus according to claim 8, further comprising an angular velocity sensor to detect the amount of camera shake.

10. The imaging apparatus according to claim 8, wherein the processor or circuit is configured to detect the amount of camera shake based on movement of a subject in at least one of the generated images.

11. The imaging apparatus according to claim 1, wherein, in a case in which the processor or circuit sets the deviation amount to the second resolving power at which the deviation amount from the target position is less than or equal to the pixel shift amount, when moving the movable portion from a first target position to a second target position, the processor or circuit performs control so that a first deviation amount generated by the movable portion vibrating at the first target position and a second deviation amount generated by the movable portion vibrating at the second target position do not overlap before and after the pixel shifts.

* * * * *